Figure 2:
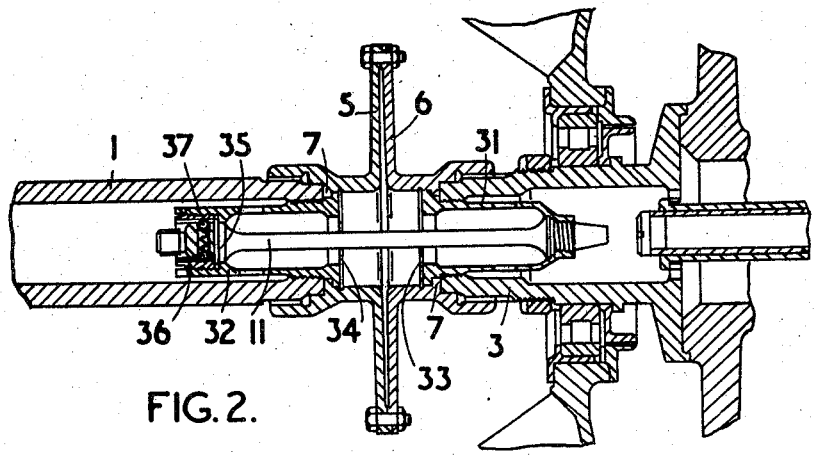

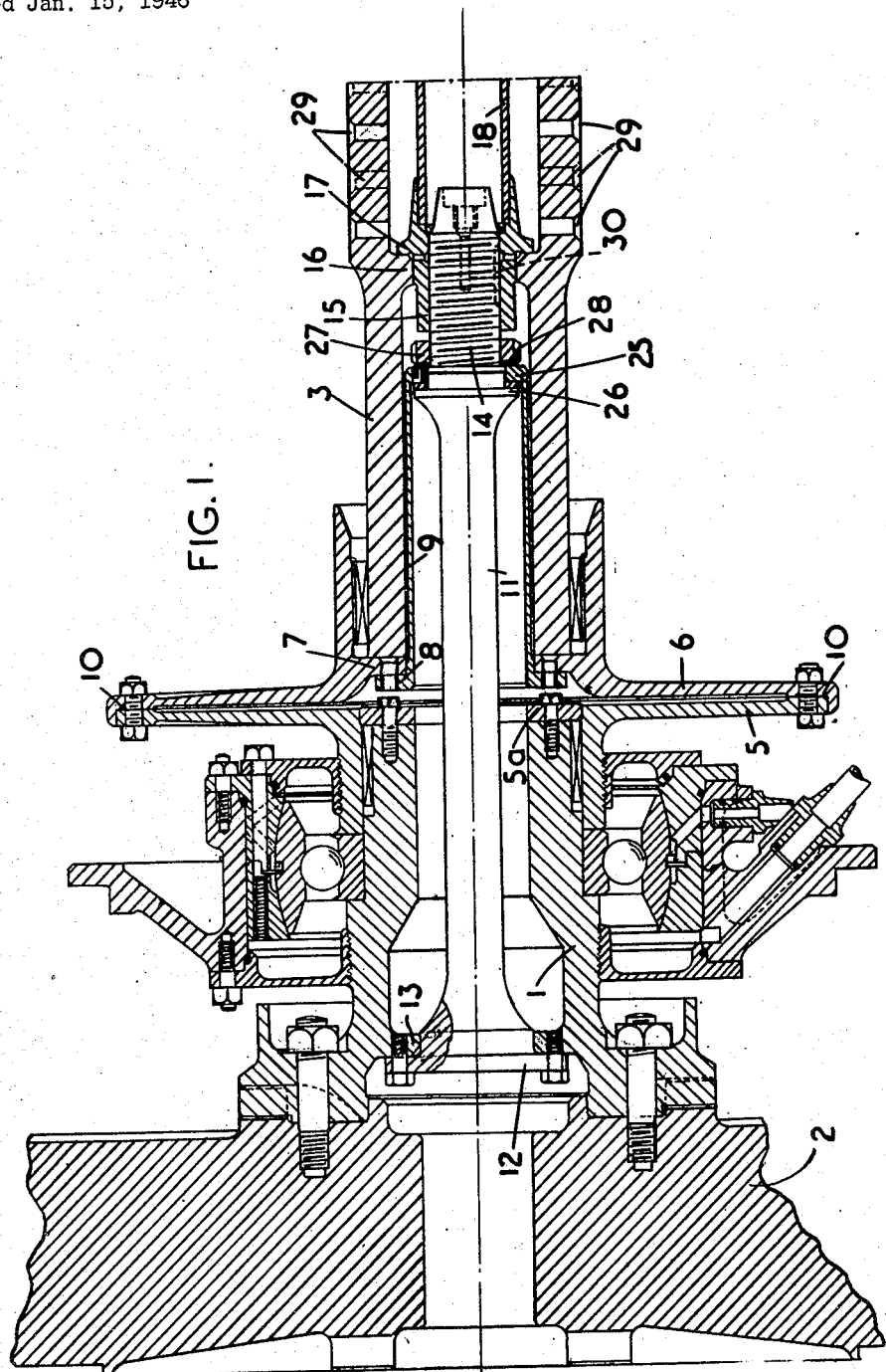

INVENTORS
RODERICK CRISTALL McLEOD,
GEOFFREY BERTRAM ROBERT FEILDEN,

BY Robert B. Larson
ATTORNEY

Patented Apr. 24, 1951

2,550,580

UNITED STATES PATENT OFFICE 2,550,580

FLEXIBLE COUPLING FOR SHAFTS AND THE LIKE

Roderick Cristall McLeod and Geoffrey Bertram Robert Feilden, Leicester, England, assignors to Power Jets (Research & Development) Limited, London, England Application January 15, 1946, Serial No. 641,306
In Great Britain January 16, 1945

15 Claims. (Cl. 64—12)

This invention relates to flexible couplings for shafts and the like of the kind frequently found to be necessary in the construction of mechanisms in which two coaxial shaft ends have to be interconnected torsionally and to be mutually supporting radially, with allowance for slight angular displacement of the shaft axes such as is inevitable in practical construction and assembly, if not in operation. In some cases it is necessary that such a coupling should be capable of sustaining axial as well as torsional loads, and in this connection it has been proposed to provide in a flexible torque transmitting coupling means for sustaining axial loads. Such provision, however, may give rise to difficulties in the dismantling of the shafting in which the coupling is incorporated, particularly in cases where the coupling is in an inaccessible position, and it is an object of the invention to facilitate such dismantling. An example of a case to which the invention has application is a gas turbine engine in which the shaft of a compressor developing end thrust in one direction is required to be coupled coaxially with the shaft of a turbine developing an opposed thrust so that the coupling is under tension, and this is in fact the particular application to which the invention is immediately directed. In such an arrangement where there may be three or more bearings for the shafting as a whole it is almost inevitable that there should be some malalignment between the shafts, and even if this did not arise in manufacture and assembly or could be adequately dealt with in the construction of the bearings themselves, it would nevertheless almost certainly arise in operation. Furthermore, the coupling in such a machine will usually be inaccessible due to the presence of combustion apparatus between the compressor and turbine, thus rendering it desirable to be able to withdraw a shaft end with its associated rotor element as a unit without direct access to the coupling. The invention facilitates the satisfaction of this requirement.

According to the invention there is provided a flexible shaft or like coupling adapted to sustain an axial load, comprising the combination of torque transmitting coupling means connecting the shaft ends and adapted to allow relative angular displacement of the shaft axes; an axial-load transmitting element adapted to accommodate such displacement and also adapted to maintain a predetermined spacing of said shaft ends under an axial load by being adjustable to sustain and transmit said load directly between the shaft ends; and means whereby upon adjustment of said element in one sense to vary its axial loading, there is a reaction to effect relative axial displacement between a shaft end and the coupling, the torque transmitting coupling means being axially disengageable to allow said displacement freely to take place. More specifically stated, the invention provides a flexible shaft or like coupling adapted to sustain a tensional load, comprising the combination of axially spaced torque-transmitting radius members on the shaft ends secured together at their outer ends, an axial tension element lying coaxially within the coupling and anchored within the shaft ends and holding the latter together under tension, both the said radius members and the tension element by their elasticity under bending load accommodatig changes of shaft alignment, and means for adjusting the tensioning of said element which, upon tension-relieving adjustment, react to effect relative displacement of a shaft end away from the coupling point, the radius members being axially disengageable from said shaft end to allow them to remain in situ while allowing said disengagement freely to take place. Preferably the tension element is a comparatively long and slender element to afford the desired lateral elasticity.

In further accordance with the invention, the tension element mentioned in the last preceding paragraph is anchored at its ends by engagement with parts forming therewith an adjustable tensioning means which, upon tensioning adjustment, reacts to draw said shaft ends together and apply tension to the tension element and includes a tension-releasing member which, upon its tension-releasing adjustment, reacts to effect relative displacement of a shaft end away from the coupling point. The said tensioning means includes, for example, a member making threaded engagement with a part of said tension element, and upon relative rotation in one direction said member and element react on the shaft ends so as to effect the desired drawing together and tensioning, and in the other direction to effect their relative retraction.

The invention is obviously capable of application in a variety of constructional forms; for example, the tensioning means referred to may include either a fixed or a rotatable threaded nut cooperating with the tensioning element, while the tension release may be effected by the same elements as the tensioning, or by others.

In order to allow the adjusting means of the axial-load transmitting element to be conveniently controlled, the shaft is made hollow to a point convenient of access from which a tool may be inserted to engage the appropriate elements of the coupling; alternatively the appropriate element of the coupling is extended through the shaft to such a point. For use in the former case, the invention further provides an automatic type of locking device for said adjusting means which, while not requiring special manipulation to enable the axial-load transmitting element to be adjusted, effectively locks said means under running conditions.

Figure 1A:
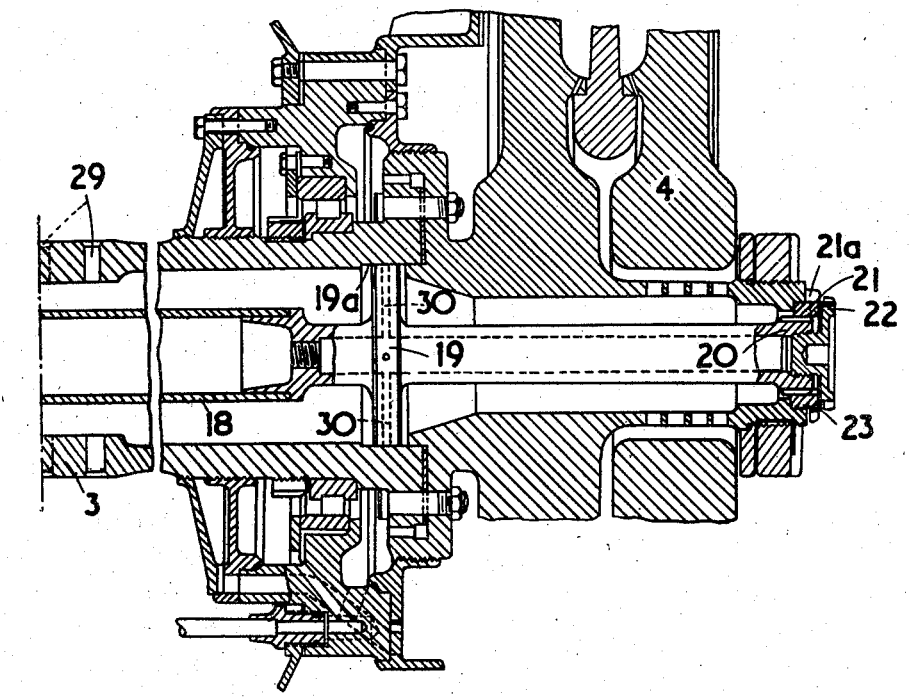

Other and more detailed features of the invention will appear from the following description with reference to the accompanying drawings, of which Figures 1 and 2 illustrate in axial section two constructional forms of tensionally loaded coupling as applied to a particular gas turbine aircraft, the supplementary Figure 1A being an extension of Figure 1 to the right showing further details of the tensioning means.

In the example illustrated in Figures 1 and 1A, the shafting to be coupled comprises a hollow shaft element 1 (Figure 1) bolted to the rotor 2 of an axial flow compressor, and a hollow shaft element 3 carrying the rotors 4 of an axial flow turbine, the shaft elements when coupled thus being under tension due to the opposed end thrusts of the compressor and turbine. The end of the compressor shaft 1 is splined to receive a similarly splined torque-transmitting radius member in the form of a disc 5 which is locked against axial withdrawal from the shaft 1 by a securing ring 5a attached to the shaft by screws. The shaft end 3 has similarly splined thereon a torque-transmitting disc 6, the disc in this case however, not being secured to the shaft 3, but having an inwardly directed flange 7 to which is secured by screws the outwardly directed flange 8 of a ferrule 9 which extends into the hollow shaft 3 for a purpose to be more fully described later. The two discs 5, 6, are axially spaced except at their rims, which have enlarged abutting flanges 10 bolted together, the spacing of said discs allowing them to flex within the elastic limit of the metal used and thus accommodate by their elasticity the anticipated misalignments of the shafts.

In order to enable the coupling to sustain the tensional load imposed by the compressor and turbine, an axial tension element constituted by a rod 11 is disposed within the shafts 1, 3, said rod 11 having at the compressor end a flange 12 which is secured by screws to a flange 13 in the bore of the shaft 1 at the side thereof remote from the coupled shaft end, and at its other end having a threaded shank 14 which is engaged by a threaded tensioning member afforded by a threaded nut or sleeve 15 having a shoulder 17 engaging an inwardly directed flange 16 of the shaft 3 on the side thereof remote from the coupled shaft end. The arrangement is thus such that by tightening the nut 15 the rod 11 may be brought into tension and, since the disc 6 has no axial connection with the shaft 3, the whole of the tensional load will be taken by the rod 11 and the torque by the discs 5, 6. The dimensions of the rod are selected, however, having regard to the mechanical characteristics of its material, so that it may flex elastically to accommodate the anticipated misalignments of the shafts.

In order that the coupling and shafts may be dismantled, the tensioning nut 15 has secured thereto an axial extension 18 which is rotatably supported in the shaft 3 by means of a circular flange formation 19 thereon and extends through the hub of the turbine rotor 4 to terminate in a head 20 splined for engagement by a suitable actuating tool, the whole being locked against rotation when assembled by means of a locking ring 21 having internal splines engaging those of the head and a slightly different number of external dogs 21a (say one more or less) which cooperate with a single dog (not shown) on the end of the shaft to provide a vernier locking effect. The locking ring 21 is secured by a retaining nut 22 threaded in an internal bore in the head 20 and bearing on the ring 21, relative rotation of the nut 22 and ring 21 being prevented by a tab washer 23.

The flange formation 19 operates in an internal annular groove at 19a in the shaft 3, which permits limited axial movement of the extension member 18 and thus of the nut 15 and provides a shoulder against which the flange 19 bears when the nut 15 and extension 18 are rotated to relieve the tension in the rod 11. It follows that upon such rotation the shaft 3 will tend to be pushed away from the shaft 1 and the parts of the coupling. In this connection the ferrule 9 already mentioned has at its end within the shaft 3 an inturned flange 25 which engages a shoulder 26 on the rod 11 at the side thereof remote from the shaft end, the ferrule being held to said shoulder by a ring 27 threaded on the screwed shank 14 of the rod 11 and locked by a tab washer 28. By this means it is ensured that the coupling disc 6 has no tendency to follow the axial movement of the shaft 3 which takes place upon dismantling. The ferrule also serves as a guide for the shaft during such movement. It is arranged that when the parts are assembled with the rod 11 under the desired tension, the end of the shaft 3 abuts against the flange 7 of the coupling disc 6, the effective length of the ferrule 9 being adjusted appropriately by inserting shims between it and the shoulder 26 with which it cooperates.

After the shaft 3 has been removed the coupling is left intact on the shaft 1 with the exception of the tensioning nut 15, and further dismantling consists in unbolting the coupling discs 5, 6 and removing the disc 5 from the shaft 1, after which the latter can be withdrawn through its bearing.

The fact that the shaft must be at least partly hollow and that the coupling and its associated parts are of a nature which does not necessarily involve complete obstruction of the shaft bore, enables the shaft to be used as a channel for the passage of cooling air or other fluid; for example in the present case ports 29 are provided in the shaft wall and the intervening flange 19 is appropriately ported, to allow a flow of cooling air to the turbine rotor.

In addition to the fact that it sustains tensional loads, the construction just described has the advantage that the coupling proper requires no lubrication, the only lubrication necessary being at the rubbing faces of the nut 15 and the flange 19, for which purpose lubricant passages 30 are provided in these parts. A further advantage, which becomes of greater importance the higher the shaft speed, is that the moment of inertia is low by virtue of the fact that the greater part of the coupling components are within the shafting and therefore at a small effective radius.

In the construction illustrated in Figure 2, in which like reference numerals to those in Figure 1 indicate like parts, the basic principles are the same, but each of the torque-transmitting discs 5, 6, is provided with a flange 7, the latter being nipped against their respective shaft ends 1, 3, by ferrules 31, 32 threaded in and extending for some distance into the shaft ends, and locked against axial movement back into the coupling proper by sprung-in rings 33, 34 (circlips). The ferrule 31 is also internally threaded at its outer end (with respect to the coupling) to form a stationary nut for the threaded end of the tension rod 11, the other end of which has a shouldered head 35 splined for engagement by a tool entered through the shaft 1. The shoulder of the head 35 engages an internal shoulder of the ferrule 32, whose outer end is suitably formed for tool-engagement. The rod 11 and ferrule 32 are locked against relative rotation in use by a device which comprises a locking ring nut 36 which screws into the end of the ferrule 32 to nip the shoulder on the head 35, the bore of the nut 36 being axially grooved for engagement by spring pressed steel balls 37 caged in the head 35 for radial movement. These balls, whilst allowing forced rotation between the ring nut 36 and head 35 during assembly or dismantling operations, constitute an effective lock when running due to the action of centrifugal force. The lock being purely automatic in its behaviour under the different conditions, and requiring no special manipulation, is eminently suitable for use in an inaccessible position, such as that illustrated in Figure 2, at which a more orthodox locking device could not be used.

In the assembly of the coupling, the radius discs 5, 6 are first secured to the shaft ends by their ferrules 31, 32, the circlips 33, 34, inserted, and the discs 5, 6, bolted up, the tension rod 11 lying loosely in the ferrule 32. The tension rod is now screwed by means of a tool inserted through the shaft 1 into the stationary nut offered by the ferrule 31, and is brought into tension to hold the shaft ends axially together by the engagement of its shouldered head 35 with the shoulder of the ferrule 32, the precise location of the rod 11 with respect to the ferrules being established by shims between mating surfaces. The locking ring 36 is now applied.

To dismantle the coupling the ring 36 is unscrewed and then the ferrule 32 is unscrewed from the shaft end 1 by means of an inserted tool. Since, however, the ferrule cannot move axially into the coupling by reason of its engagement with the circlip 34, the effect of such unscrewing is to displace the shaft end 1 outwardly from the coupling, leaving the latter standing. If the handing of the threading between the rod 11 and ferrule 31, and the latter and between the shaft end 3 is made opposite, a further extraction can now be obtained by unscrewing the ferrule 31 through the rod 11, the effect of which is to displace the coupling axially in relation to the shaft end 3.

It will be appreciated that the construction illustrated in Figure 2 offers advantages similar to those enumerated in connection with Figure 1, although it has not been thought necessary again to illustrate a specific arrangement of air and lubricant passages.

We claim:

1. A flexible, axial load sustaining coupling for coaxially disposed shafts and the like, comprising torque transmitting coupling means mounted on and connecting the shaft ends and adapted to allow relative angular displacement of the shaft axes, the mounting of said coupling means on at least a first of said shaft ends comprising cooperating surfaces on the coupling means and first shaft slidable axially relative to each other but in engagement to prevent relative rotary movement of the shaft coupling means, an axial-load transmitting element adapted to accommodate such angular displacement of the shaft axes, and means connecting said load transmitting element and said shafts, said connecting means including an adjustable member having a first surface facing generally in one axial direction and engaging one of said shafts to transmit tension between the shaft and said element, said adjustable member also having a second surface facing generally in the other axial direction and which, upon adjustment of said adjustable member in a predetermined manner, engages and reacts against one of said shafts to force the shafts apart axially.

2. A coupling as set forth in claim 1, wherein said adjustable member is rotatable, and wherein said surfaces of the adjustable member bear against said first shaft.

3. A coupling as set forth in claim 1, wherein at least the end portions of said shafts are hollow, said axial load transmitting element lying coaxially within said hollow ends.

4. A coupling as set forth in claim 1, wherein said adjustable member extends into one of said shafts, said shaft being hollow to a point permitting convenient access to said adjusting member for adjustment thereof.

5. A coupling as set forth in claim 1, wherein said adjustable member comprises a tension adjusting element threaded on said axial-load transmitting element.

6. A coupling as set forth in claim 1, wherein said axial-load transmitting element is fixed to one of said shafts, said adjustable member connecting said axial-load transmitting element to the other shaft.

7. A coupling as set forth in claim 1, wherein said coupling means comprises a pair of radial elements attached together wih one mounted on each shaft end, the first of said radial elements being mounted on said first shaft, and means carried by said first radial element and cooperating with said axial-load transmitting element for holding said first radial element against axial movement with said first shaft when said first shaft is forced axially away from the other shaft.

8. A coupling as set forth in claim 7, wherein said last-mentioned means comprises a ferrule within the end of said first shaft and surrounding the axial-load transmitting element, means rigidly connecting one end of said ferrule with said first radial element, and means connecting the other end of said ferrule with the axial-load transmitting element, at least one of said connecting means permitting detachment of the ferrule.

9. A coupling as set forth in claim 1, and port means in at least one shaft and the associated parts of the coupling to allow internal air flow.

10. A coupling according to claim 1, wherein said connecting means includes two ferrules mounted, respectively, at spaced location on said axial-load transmitting element, the first of said ferrules comprising said adjusting member.

11. A coupling as set forth in claim 10, and cooperating abutment means on said first ferrule and on said axial-load transmitting element, holding said element against axial movement in the direction of the other ferrule but permitting rotation of said element, the mounting of the second of said ferrules on said axial-load transmitting element being threaded, whereby rotation of said element adjusts the tension transmitted thereby.

12. A coupling as set forth in claim 11, wherein the mounting of the coupling means on the second shaft is by an axially slidable arrangement similar to the mounting of the coupling means on said first shaft, said second ferrule being attached to said second shaft by threads, the hand of which causes said coupling and second shaft to be displaced apart upon rotation of the axial-load transmitting element to unscrew the second ferrule.

13. A coupling as set forth in claim 1, wherein said connecting means includes two ferrules mounted, respectively, on each end of said axial-load transmitting element and having shoulders clamping said coupling means against the respective shaft ends.

14. A coupling as set forth in claim 1, wherein said connecting means includes two ferrules mounted, respectively, on each end of said axial-load transmitting element, a threaded connection between one ferrule and said element, and a centrifugally operated locking device connecting the other end of said element to the other ferrule, said other ferrule comprising said adjustable member.

15. A coupling as set forth in claim 1, wherein said connecting means includes two ferrules mounted, respectively, at spaced locations on said axial-load transmitting element, one of said ferrules comprising said adjustable element, a threaded connection between said one ferrule and said first shaft, the surfaces of which threaded connection comprise said first and second surfaces, and means connected to said coupling means for preventing movement of said one ferrule axially away from said first shaft, whereby rotation of said one ferrule relative to said first shaft forces said first shaft axially away from said one ferrule.

RODERICK CRISTALL McLEOD.
GEOFFREY BERTRAM ROBERT FEILDEN.

REFERENCES CITED

The following references are of record in the file of this patent:

UNITED STATES PATENTS

| Number | Name | Date |
|---|---|---|
| 1,639,644 | Baumann | Aug. 23, 1927 |